United States Patent [19]

Dorsch

[11] 4,042,285

[45] Aug. 16, 1977

[54] THRUST BEARING

[75] Inventor: Hans H. Dorsch, Cheraw, S.C.

[73] Assignee: INA Bearing Company, Inc., Cheraw, S.C.

[21] Appl. No.: 676,242

[22] Filed: Apr. 12, 1976

[51] Int. Cl.$^2$ ............................................. F16C 33/38
[52] U.S. Cl. ................................... 308/235; 308/217; 403/52
[58] Field of Search ............... 308/202, 217, 218, 216, 308/219, 235, 236; 403/52; 235/217, 219, 235

[56] References Cited

U.S. PATENT DOCUMENTS

| | | | |
|---|---|---|---|
| 3,226,170 | 12/1965 | Neese | 308/235 |
| 3,469,896 | 9/1969 | Pitner | 308/235 |
| 3,501,211 | 3/1970 | Molloy | 308/235 |
| 3,785,710 | 1/1974 | Alling | 308/235 |
| 3,787,104 | 1/1974 | Alling | 308/235 |
| 3,876,267 | 4/1975 | Schaeffler et al. | 308/235 |
| 3,900,235 | 8/1975 | Alling et al. | 308/235 |
| 3,937,541 | 2/1976 | Alling et al. | 308/235 |

Primary Examiner—Richard A. Bertsch
Attorney, Agent, or Firm—Bell, Seltzer, Park & Gibson

[57] ABSTRACT

A thrust bearing characterized by simplicity of construction and improved life and including a pair of bearing races with a cage and rolling elements positioned between the races. Arcuately spaced lugs integrally formed on one bearing race extend in an axial direction and are provided with latching members thereon to engage the other bearing race and thereby hold the bearing races and the cage in assembled relation. An improved one-piece cage is disclosed having portions on each face of the cage which protrude outwardly for centering the cage between the opposing bearing races to facilitate proper guidance of the rolling elements.

19 Claims, 7 Drawing Figures

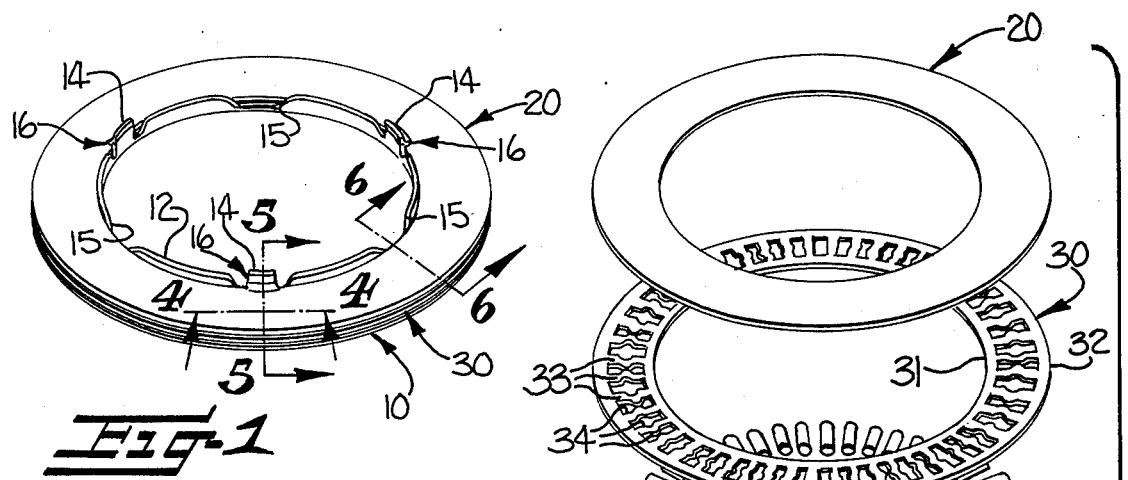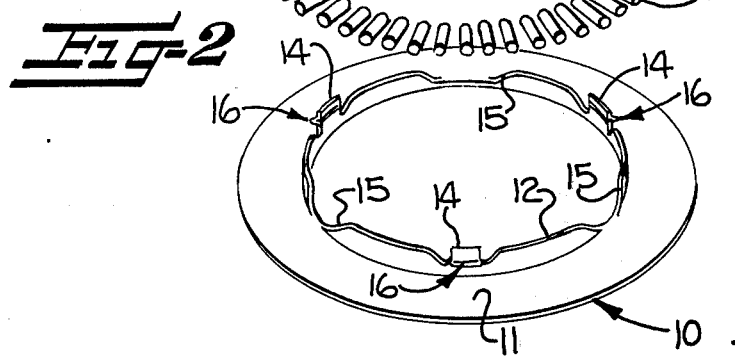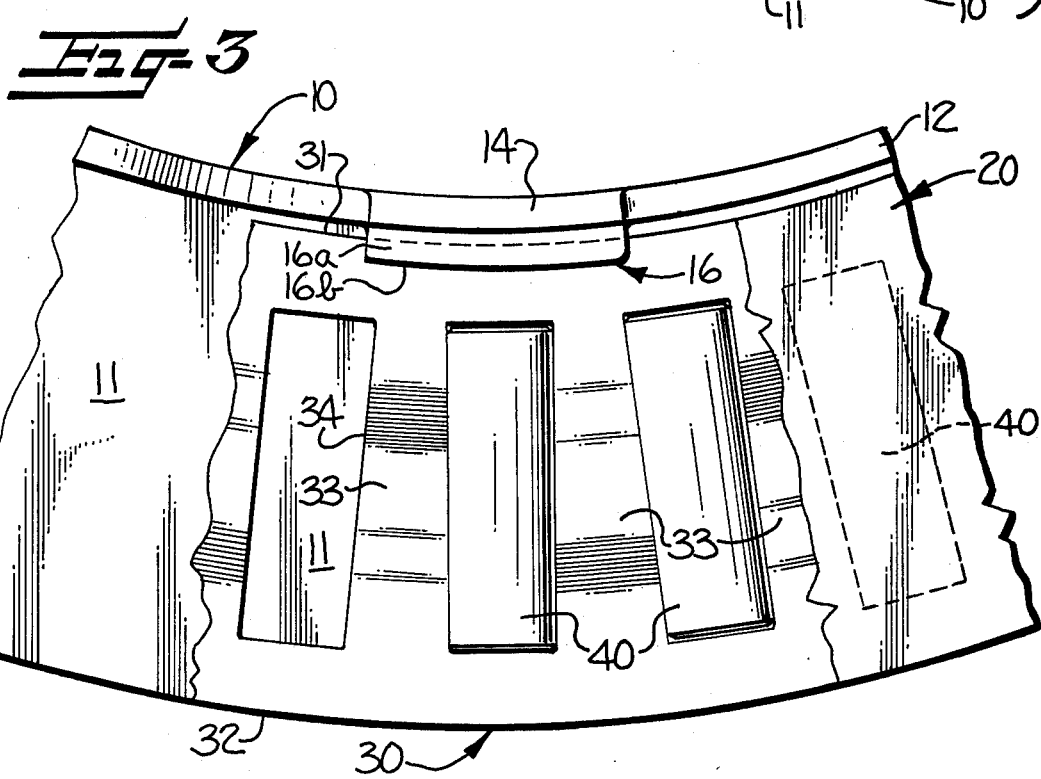

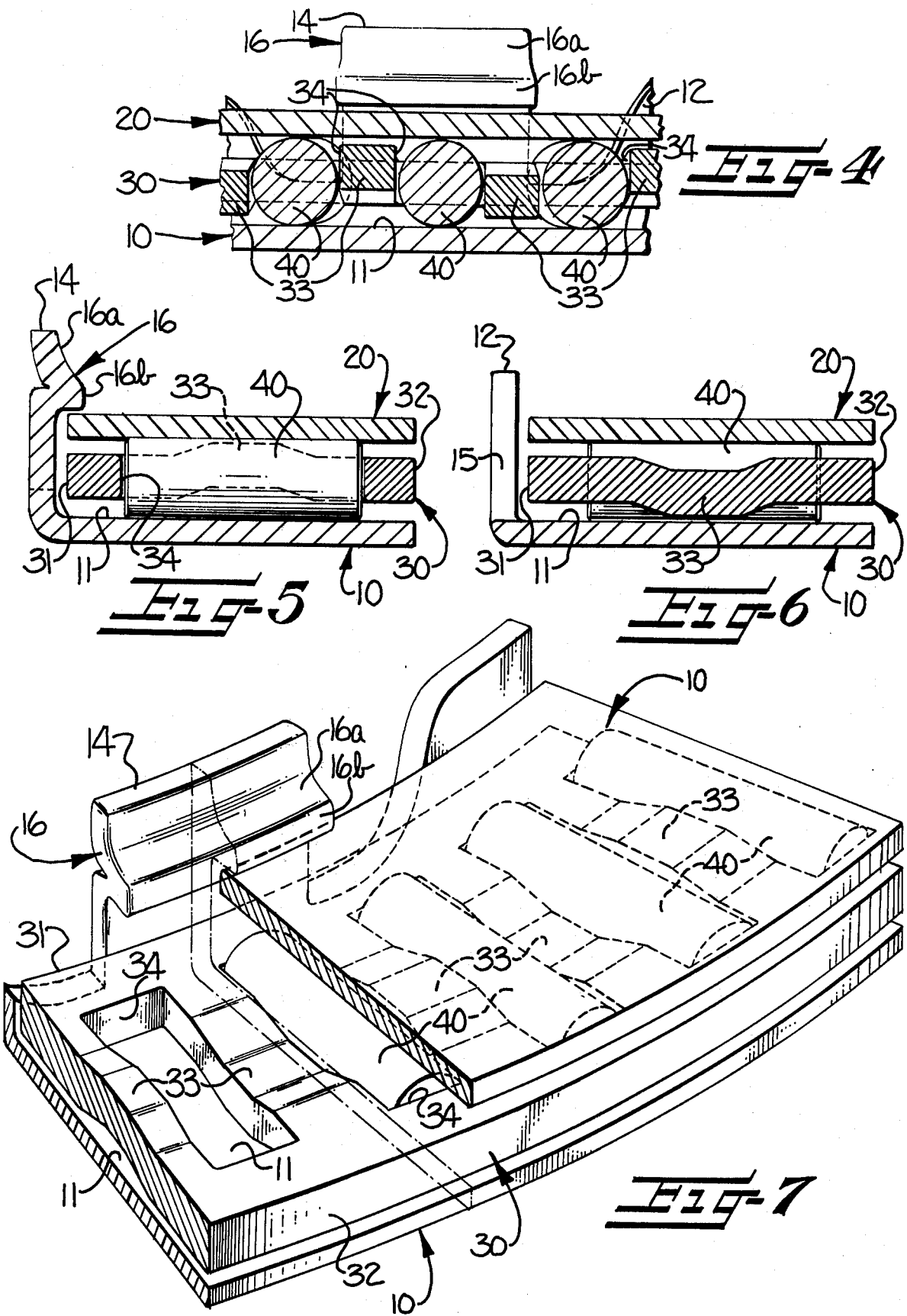

THRUST BEARING

This invention relates to thrust bearings, and more particularly to a new and improved encapsulated thrust bearing assembly characterized by simplicity of construction and improved service life.

Conventional thrust bearings include a pair of opposing annular bearing races with a cage and rolling elements positioned therebetween. The races and the cage are held together in a number of different ways to form a unitary bearing assembly. In accordance with one conventional approach, a separate element in the form of an annular band retains the bearing components together. In another approach, avoiding the need for a separate element, the bearing races are formed with flanges having projections designed to engage the cage and retain the bearing components together as an assembly. However, the presence of flanges on both the inner and outer periphery undesirably impedes circulation of lubricant to the rolling elements.

For example, in the recent Alling et al U.S. Pat. Nos. 3,713,713; 3,900,235; and No. Re. 28,431, the thrust bearing components are held together by a flange with conventional projections on one bearing race and by a flange with lanced tabs on the other bearing race. The projections and the tabs interlockingly engage with portions of the cage to hold the bearing components together as an assembly. Although cut-outs are formed in the flanges for circulation of lubricant, the presence of the flanges along the inner and outer periphery necessarily impedes the circulation of lubricant into the interior of the bearing assembly to some degree. In addition, the tabs, which are punched, or lanced from the material of the flange, have sharp edges which under some circumstances, as for example if the bearing becomes unloaded, may result in wear between the sharp edges of the tab and the cage.

With the foregoing in mind, it is a primary object of the present invention to provide a thrust bearing assembly which allows for a greatly increased circulation of lubricant into and through the bearing assembly to thereby provide for greater bearing life.

It is a further object of this invention to provide a thrust bearing assembly of simplified construction and of reduced cost in which the bearing components may be assembled simply by snapping together.

It is another object of this invention to provide a thrust bearing cage of improved and simplified one-piece construction which may be manufactured at a reduced cost and whose design contributes to the enhanced life of the bearing.

In accordance with the present invention, the components of the bearing assembly are held together in such a manner that the periphery of the bearing assembly may be left open to provide for enhanced flow of lubricant into and through the bearing assembly. This is accomplished by providing latching means formed integrally with one of the bearing races and extending therefrom and engagingly retaining the other bearing race so as to maintain the components of the thrust bearing assembly in assembled relation.

More particularly, the bearing assembly is held together by one or more lugs which are integrally formed on one race and which have a latching member thereon which engagingly retain the other race. The latching members include an inclined camming surface which serves to deflect the lugs radially during assembly to permit the other bearing components to be snapped into place beyond the latching member. The latching member also includes a radially extending abutment surface which engages the outer surface of the second race to thereby engagingly retain the same in position. The latching member is formed in such a manner that the surface thereof presents no sharp edges capable of contacting the other bearing components and thus avoids the possibility of wear therebetween. The construction of the bearing assembly permits the use of a cage of the type not requiring rolling element retention. The present invention provides an improved type of one-piece cage having portions which protrude outwardly from the face of the cage in opposite directions and serve to maintain the cage in spaced relation from the opposing raceways.

Some of the advantages and features of the invention having been stated, others will become apparent from the following detailed description of the preferred embodiment of the invention and from the accompanying drawings in which:

FIG. 1 is a perspective view of the encapsulated thrust bearing assembly of this invention;

FIG. 2 is a perspective view of the thrust bearing assembly of FIG. 1 shown in exploded relation to reveal the various component parts of the bearing assembly;

FIG. 3 is a greatly enlarged fragmentary detailed view of the bearing assembly of FIG. 1, with a portion of the upper bearing race and the cage being broken away for purposes of illustration to reveal the underlying cage, rolling elements, and lower bearing race;

FIG. 4 is an enlarged fragmentary sectional view of the bearing assembly taken substantially along the line 4—4 of FIG. 1;

FIG. 5 is an enlarged sectional view of the bearing assembly taken substantially along the line 5—5 of FIG. 1;

FIG. 6 is an enlarged sectional view of the bearing assembly taken substantially along the line 6—6 of FIG. 1; and FIG. 7 is a greatly enlarged fragmentary perspective view of the bearing assembly.

Referring now more particularly to the drawings, where like reference characters identify like parts throughout the various views, the thrust bearing assembly includes a pair of opposing bearing races, generally indicated at 10, 20 respectively, with a cage 30 and a plurality of rolling elements 40 being positioned between the opposing bearing races.

The first bearing race 10, more particularly, comprises a flanged thrust washer of L-shaped cross-section having a radially extending surface portion defining a raceway 11 with an integrally formed axially extending flange portion 12 along the inner circumferential periphery thereof. As illustrated, the flange 12 is discontinuous, with portions thereof provided at arcuately spaced locations around the inner periphery of the race, and with a lug 14 being provided in each of the flange portions. Flange 12 may, if desired, extend continuously around the periphery of the race, with one or more lugs provided thereon. As illustrated, the lugs 14 extend axially beyond the second bearing race 20. Between the arcuately spaced flange portions along the inner periphery of the race 10, openings 15 are defined which facilitate the flow of lubricant through the bearing. The second race 20 comprises a plain non-flanged annular thrust washer.

The races 10 and 20 are held together in assembled relation by latching members 16 provided on the lugs 14. As seen more clearly in FIG. 5, a portion of the lug 14 which extends axially beyond the second race 20 is doubled upon itself and projects radially outwardly to form the latching member. The latching member has a substantially continuous surface extending from the lug which includes an inclined surface portion 16a as well as radially extending portion 16b. The inclined surface portion 16a defines a camming surface which serves to deflect the lug 14 radially inwardly during assembly to allow the cage 30 and the second race 20 to be snapped into place beyond the latching member. The radially extending surface portion 16b defines an abutment surface or shoulder for engaging the outer peripheral portions of the race 20 and retaining the race 20 and the cage 30 in assembled relation with the race 10. It will be seen that the lug 14 are free to be deflected inwardly during assembly to permit the cage and the race 20 to be snapped into place. Once the bearing assembly is installed on a shaft, however, the shaft prohibits the lugs 14 from deflecting inwardly and in this way insures a permanent and secure thrust bearing assembly.

With the first and second bearing races 10 and 20 positioned in assembled relation on opposite sides of the cage 30 and the rolling elements 40 retained together in the manner described, it will be seen that the outer periphery of the bearing assembly may be left open, since no flanges are necessary for retaining the parts together. Thus, as illustrated the outer peripheral edge portions of the first and second bearing races 10 and 20 are spaced apart from one another. This provides for substantially unrestricted flow of lubricant through the bearing. The openings 15 on the inner flange 12 also serve to facilitate the flow of lubricant through the bearing.

While the lugs 14 are preferably and advantageously located on the inner periphery of the race 10 for the reasons noted, it is recognized that this arrangement may be reversed while still deriving many of the noted advantages of the invention.

The latching member 16 is cold formed on the lug 14 by upsetting or compressing the lug in an axial direction while restraining the lug from moving except in the direction where the latching member is to be formed. The latching members formed in this manner have no sharp corners or rough, raw edges in areas exposed to contact with other components of the bearing assembly. Thus, in the event that the bearing should become unloaded for one reason or another, the rounded corners of the latching member reduce the likelihood of wear on the race 20.

The flange portions 12 and the respective lugs 14 serve as a guiding surface for the cage 30 and the race 20. These portions 12 may be omitted however, if desired, without impairing the function of the bearing assembly. In such event, only the lugs 14 with the latching members 16 thereon would extend from the inner periphery of the race 10, the remainder of the inner periphery of the race, as well as the entire outer periphery, being open to provide for substantially unrestricted circulation of lubricant through the bearing.

Since the race components of the bearing assembly of this invention are connected together directly and thereby capture the cage and the rolling elements therebetween, it is not necessary for the cage to provide for retention of the rolling elements. This allows for the use of a simple one-piece cage such as the type indicated in FIG. 2 by the reference character 30. This cage, which is the preferred type of cage for use in the bearing assembly of the present invention, may be produced at a significant reduction in cost as compared to the more complicated single or multi-piece cages presently available which generally have critical manufacturing tolerances in order to achieve the needed retention of the rolling elements.

More particularly, the cage 30 comprises a one-piece annular member having inner and outer substantially coplanar circumferential rim portions 31, 32 respectively interconnected by a plurality of radially extending cross-bars 33 which are arcuately spaced from one another to form openings 34 in the cage for receiving the rolling elements 40 therein.

In order to maintain the cage 30 in spaced relation from the opposing raceways, certain of the cross-bars 33 on each face of the cage have portions which protrude outwardly from the cage and are adapted to bear against the respective adjacent raceways. More particularly, three or more of the cross-bars at arcuately spaced locations around the circumference of the cage are bent so as to protrude from one face of the cage, while three or more different cross-bars, also arcuately spaced around the circumference are bent so as to protrude from the opposite face of the cage.

Preferably, and as illustrated, alternate cross-bars have medial portions which are bent so as to protrude in one direction while the intervening cross-bars are bent so as to protrude in the opposite direction. It will also be noted that the cross-bars 33 of the cage are desirably bent so as to protrude outwardly a distance less than the thickness of the material forming the cage. The protruding portion of the cross-bar is shaped in such a way as to form a rounded contact area. Such a configuration has the advantage of building up a hydrodynamic lubricating film between the contacting portions of the cross-bar and the raceway. This construction insures that little or no wear takes place between cage and raceways.

The rounded contact areas formed on the cross-bars also prevent any burrs which might remain after the forming of the cage from contacting and resultantly damaging or destroying the adjacent raceways. The cage may be formed from sheet metal in a suitable punching operation, or from plastic by conventional extruding or molding techniques.

As illustrated in the drawings, the cage is formed of substantially uniform thickness material, which may, as illustrated, be of substantially greater thickness than the wall thickness of the races 10 and 20. The relatively heavy wall thickness of the cage provides rigidity to the cage and also provides a substantial area to serve as a guiding surface against either the shaft or the bearing housing. Thin-wall cages have the tendency of cutting into either the shaft or the bearing housing.

It will be readily appreciated by persons skilled in the art that this cage is not limited to use solely in the particular bearing assembly described herein, but may be employed in other types of thrust bearing assemblies for which cages of the non-retaining type are suited.

In the drawings and specification, there has been set forth a preferred embodiment of the invention, and although specific terms are employed, they are used in a generic and descriptive sense only and not for purposes of limitation.

What which is claimed is:

1. A thrust bearing assembly comprising an annular cage, a plurality of rolling elements positioned in said cage, first and second bearing races positioned on opposite sides of said cage and having opposing surface portions defining respective annular raceways cooperating with said rolling elements, and latching means formed integrally with said first bearing race on the inner circumferential periphery thereof and extending therefrom and engagingly retaining said second bearing race to thereby maintain the components of the thrust bearing assembly in assembled relation.

2. A thrust bearing assembly according to claim 1 wherein said latching means comprises at least one lug extending axially toward and alongside said second bearing race, and a latching member on said lug extending radially outwardly from the lug and engagingly retaining said second bearing race.

3. A thrust bearing assembly according to claim 2 wherein said second bearing race comprises a substantially flat annular thrust washer.

4. A thrust bearing assembly comprising an annular cage, a plurality of rolling elements positioned in said cage, first and second bearing races positioned on opposite sides of said cage and having opposing radially extending surface portions defining respective annular raceways cooperating with said rolling elements, a circumferential flange integrally formed along a peripheral edge portion of said first bearing race and extending axially alongside said cage and said second bearing race, said second bearing race being unflanged and comprising a substantially flat annular thrust washer, at least one lug carried by said flange and extending axially beyond said second bearing race, and a latching member on said lug extending radially from the lug and engagingly retaining said second bearing race to thereby maintain the components of the thrust bearing assembly in assembled relation.

5. A thrust bearing assembly according to claim 4 wherein said circumferential flange is located along the inner peripheral edge portion of said first bearing race and the outer peripheral edge portion of said first and second bearing races are spaced apart from one another in opposing relation throughout the circumferential extent of the bearing assembly to facilitate the flow of lubricant throughout the bearing assembly.

6. A thrust bearing assembly according to claim 4 including a plurality of openings at arcuately spaced locations around said circumferential flange for facilitating the circulation of lubricant throughout the bearing assembly.

7. A thrust bearing assembly according to claim 4 wherein said circumferential flange is discontinuous and comprises a plurality of arcuately spaced flange portions, and one of said lugs is formed integrally with and extends axially from medial portions of each of said flange portions.

8. A thrust bearing assembly comprising first and second bearing races having opposing radially extending surface portions defining respective annular raceways, a cage positioned between said first and second bearing races, and a plurality of rolling elements positioned in said cage, said cage comprising a one-piece annular member having inner and outer substantially coplanar circumferential rim portions interconnected by a plurality of radially extending cross-bars arcuately spaced from one another to form openings in the cage for receiving said rolling elements therein, each face of the cage having at least certain arcuately spaced cross-bars with portions thereof protruding outwardly for engaging the respective adjacent raceway and thereby maintaining the rim portions of the cage in spaced relation from the opposing races to facilitate guidance of the rolling elements.

9. A thrust bearing assembly according to claim 8 wherein said one-piece annular member is formed from sheet metal of substantially uniform thickness and wherein each face of the cage has medial portions of certain arcuately spaced crossbars bent so as to protrude outwardly for engaging medial portions of the respective adjacent raceway.

10. A thrust bearing assembly according to claim 9 wherein said certain bent cross-bars protrude outwardly a distance less than the thickness of the annular member.

11. A thrust bearing assembly according to claim 9 wherein alternate ones of said cross-bars are bent so as to protrude from the cage in one direction and wherein intervening ones of said cross-bars are bent so as to protrude from the cage in the opposite direction.

12. A thrust bearing assembly according to claim 8 wherein said cage is formed of material of greater thickness than said first and second bearing races.

13. A thrust bearing race adapted for use in a thrust bearing assembly and comprising a radially extending annular raceway, a plurality of arcuately spaced lugs integral with and projecting axially from said raceway, and a latching member integral with and extending from a radially facing surface of each of said lugs, said latching member including an abutment surface extending radially from the surface of said lug in opposing relation to said raceway for engagingly retaining other components of the bearing assembly and a camming surface extending at an incline from the surface of said lug and adjoining said abutment surface and being adapted for deflecting the lug radially during assembly to allow the other components of the bearing assembly to be snapped into place.

14. A thrust bearing assembly comprising an annular cage, a plurality of rolling elements positioned in said cage, first and second bearing races positioned on opposite sides of said cage and having opposing surface portions defining respective annular raceways cooperating with said rolling elements, and latching means formed integrally with said first bearing race and extending therefrom and engagingly retaining said second bearing race to thereby maintain the components of the thrust bearing in assembled relation, said latching means comprising at least one lug extending axially toward and alongside said second bearing race, and a latching member on said lug having a radially extending abutment surface for engaging portions of the second bearing race to retain the same and the cage in assembled relation, and having an inclined camming surface adapted for deflecting the lug radially during assembly to allow the second bearing race and the cage to be snapped into place past the latching member.

15. A thrust bearing assembly according to claim 14 wherein said abutment surface and said camming surface both extend from the surface of the lug and adjoin one another to form a continuous surface on said latching member devoid of sharp edges in areas which may come into contact with the other bearing components.

16. A thrust bearing assembly comprising an annular cage, a plurality of rolling elements positioned in said cage, first and second bearing races positioned on opposite sides of said cage and having opposing surface portions defining respective annular raceways cooperating with said rolling elements, and latching means formed integrally with said first bearing race and extending therefrom and engagingly retaining said second bearing race to thereby maintain the components of the thrust bearing in assembled relation, said latching means comprising at least one lug extending axially toward and alongside said second bearing race, and a latching member on said lug extending radially from the lug and engagingly retaining said second bearing race, said lug being formed from material of substantially uniform thickness and projecting axially beyond said second bearing race, a portion of said lug located beyond said second bearing race being doubled upon itself and extending radially from the remaining portions of the lug to define said latching member.

17. A thrust bearing assembly comprising an annular cage, a plurality of rolling elements positioned in said cage, first and second bearing races positioned on opposite sides of said cage and having opposing surface portions defining respective annular raceways cooperating with said rolling elements, and latching means formed integrally with said first bearing race and extending therefrom and engagingly retaining said second bearing race to thereby maintain the components of the thrust bearing assembly in assembled relation, said cage comprising a one-piece annular member having inner and outer circumferential rim portions interconnected by a plurality of radially extending cross-bars arcuately spaced from one another to form openings in the cage for receiving said rolling elements therein, each face of the cage having at least certain arcuately spaced cross-bars with portions thereof protruding outwardly for engaging the respective adjacent raceway and thereby maintaining the rim portions of the cage in spaced relation from the opposing races to facilitate guidance of the rolling elements.

18. A thrust bearing assembly according to claim 17 wherein said one-piece annular member is formed from material of substantially uniform thickness and wherein each face of the cage has medial portions of certain arcuately spaced cross-bars bent so as to protrude outwardly for engaging medial portions of the respective adjacent raceway.

19. A cage adapted for use in a thrust bearing assembly between respective bearing raceways for receiving therein and guiding a plurality of rolling elements, said cage comprising a one-piece annular member having inner and outer substantially coplanar circumferential rim portions interconnected by a plurality of radially extending cross-bars arcuately spaced from one another to form openings in the cage for receiving rolling elements therein, each face of the cage having at least certain arcuately spaced cross-bars with portions thereof protruding outwardly and adapted to bear against the respective adjacent raceways for thereby maintaining the rim portions of the cage in spaced relation from the opposing raceways to facilitate guidance of the rolling elements.

* * * * *